United States Patent
Salter et al.

(10) Patent No.: US 9,796,304 B2
(45) Date of Patent: Oct. 24, 2017

(54) VEHICLE FLOOR LIGHTING SYSTEM HAVING A PIVOTABLE BASE WITH LIGHT-PRODUCING ASSEMBLY COUPLED TO BASE

(71) Applicant: Ford Global Technologies, LLC, Dearborn, MI (US)

(72) Inventors: Stuart C. Salter, White Lake, MI (US); James J. Surman, Clinton Township, MI (US); Daniel Weckstein, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 14/743,496

(22) Filed: Jun. 18, 2015

(65) Prior Publication Data

US 2015/0283940 A1 Oct. 8, 2015

Related U.S. Application Data

(63) Continuation-in-part of application No. 14/603,636, filed on Jan. 23, 2015, now Pat. No. 9,573,517, which is a continuation-in-part of application No. 14/086,442, filed on Nov. 21, 2013.

(51) Int. Cl.
*B60N 2/30* (2006.01)
*H05B 37/02* (2006.01)
*B60Q 3/68* (2017.01)
*B60Q 3/233* (2017.01)
*B60Q 3/30* (2017.01)

(52) U.S. Cl.
CPC ............... *B60N 2/30* (2013.01); *B60Q 3/233* (2017.02); *B60Q 3/68* (2017.02); *H05B 37/0218* (2013.01); *H05B 37/0227* (2013.01); *B60Q 3/30* (2017.02); *Y02B 20/46* (2013.01)

(58) Field of Classification Search
CPC .... B60Q 3/0223; B60Q 3/0203; B60Q 3/008; B60Q 3/20; B60Q 2/233; B60Q 2300/22; B60N 2/30; B60N 2/02; F21W 2101/08
See application file for complete search history.

(56) References Cited

U.S. PATENT DOCUMENTS

| 2,486,859 | A | 11/1949 | Meijer et al. |
| 4,132,447 | A * | 1/1979 | Terada ................... B60N 2/206 297/367 R |
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |

(Continued)

FOREIGN PATENT DOCUMENTS

| CN | 101337492 A | 1/2009 |
| CN | 201169230 Y | 2/2009 |

(Continued)

*Primary Examiner* — Robert May
(74) *Attorney, Agent, or Firm* — Vichit Chea; Price Heneveld LLP

(57) ABSTRACT

A floor lighting system of a vehicle is provided herein. A vehicle seat has a seat base that is movable between a use position and a stowed position. A light-producing assembly is coupled to an underside portion of the seat base and operable to illuminate at least one floor area based on the position of the seat base.

16 Claims, 4 Drawing Sheets

(56) References Cited

U.S. PATENT DOCUMENTS

| | | | |
|---|---|---|---|
| 6,117,362 A | 9/2000 | Yen et al. | |
| 6,419,854 B1 | 7/2002 | Yocom et al. | |
| 6,428,096 B2 * | 8/2002 | Reitze | B60N 2/44 297/188.04 |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 * | 9/2007 | Hulse | |
| 7,293,831 B2 * | 11/2007 | Greene | B60N 2/02 297/217.6 |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,235,567 B2 * | 8/2012 | Hipshier | B60R 7/04 362/154 |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 * | 4/2015 | Lowenthal | H01L 25/048 313/503 |
| 9,050,914 B2 * | 6/2015 | Hage-Hassan | B60N 2/3045 |
| 9,057,021 B2 | 6/2015 | Kingsley et al. | |
| 9,065,447 B2 | 6/2015 | Buttolo et al. | |
| 9,187,034 B2 * | 11/2015 | Tarahomi | B60Q 3/0283 |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

VEHICLE FLOOR LIGHTING SYSTEM HAVING A PIVOTABLE BASE WITH LIGHT-PRODUCING ASSEMBLY COUPLED TO BASE

CROSS-REFERNCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," now U.S. Pat. No. 9,573,517, which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a floor lighting system of a vehicle is provided. A vehicle seat has a seat base that is movable between a use position and a stowed position. A light-producing assembly is coupled to an underside portion of the seat base and operable to illuminate at least one floor area based on the position of the seat base.

According to another aspect of the present invention, a floor lighting system of a vehicle is provided. A vehicle seat has a seat base that is movable between a use position and a stowed position. A light-producing assembly is coupled to an underside portion of the seat base and operable to illuminate a footwell area in front of the seat when the seat base is in the use position and a step-in area behind the seat when the seat base is in the stowed position.

According to yet another aspect of the present invention, a floor lighting system of a vehicle is provided. The vehicle seat has a seat base. A light-producing assembly is coupled to an underside portion of the seat base and operable to illuminate by luminescence at least one floor area based on the position of the seat base.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
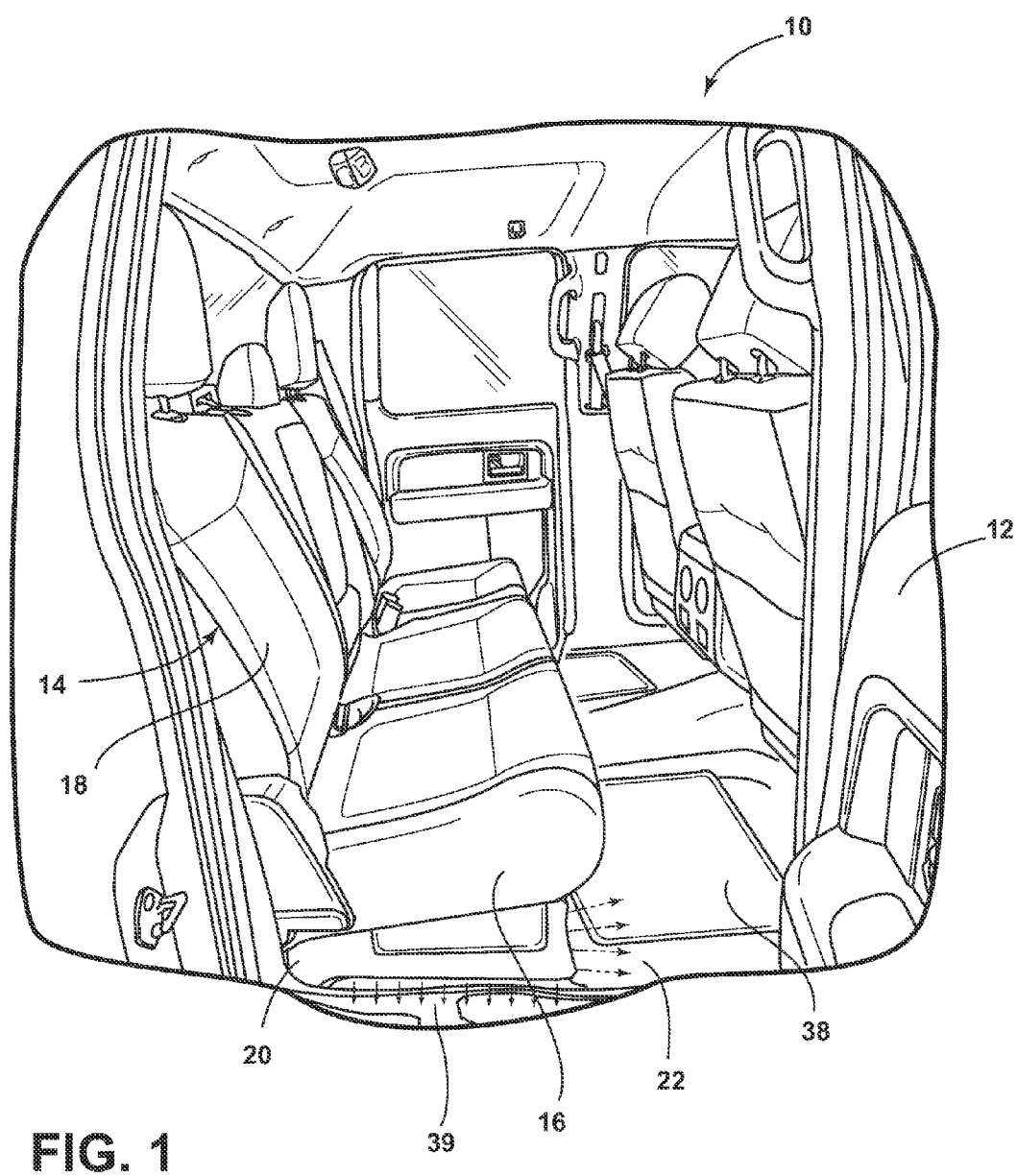
FIG. 1 illustrates a floor lighting system in which several floor areas are illuminated as a result of a seat being positioned in a use position, according to one embodiment.
Figure 2:
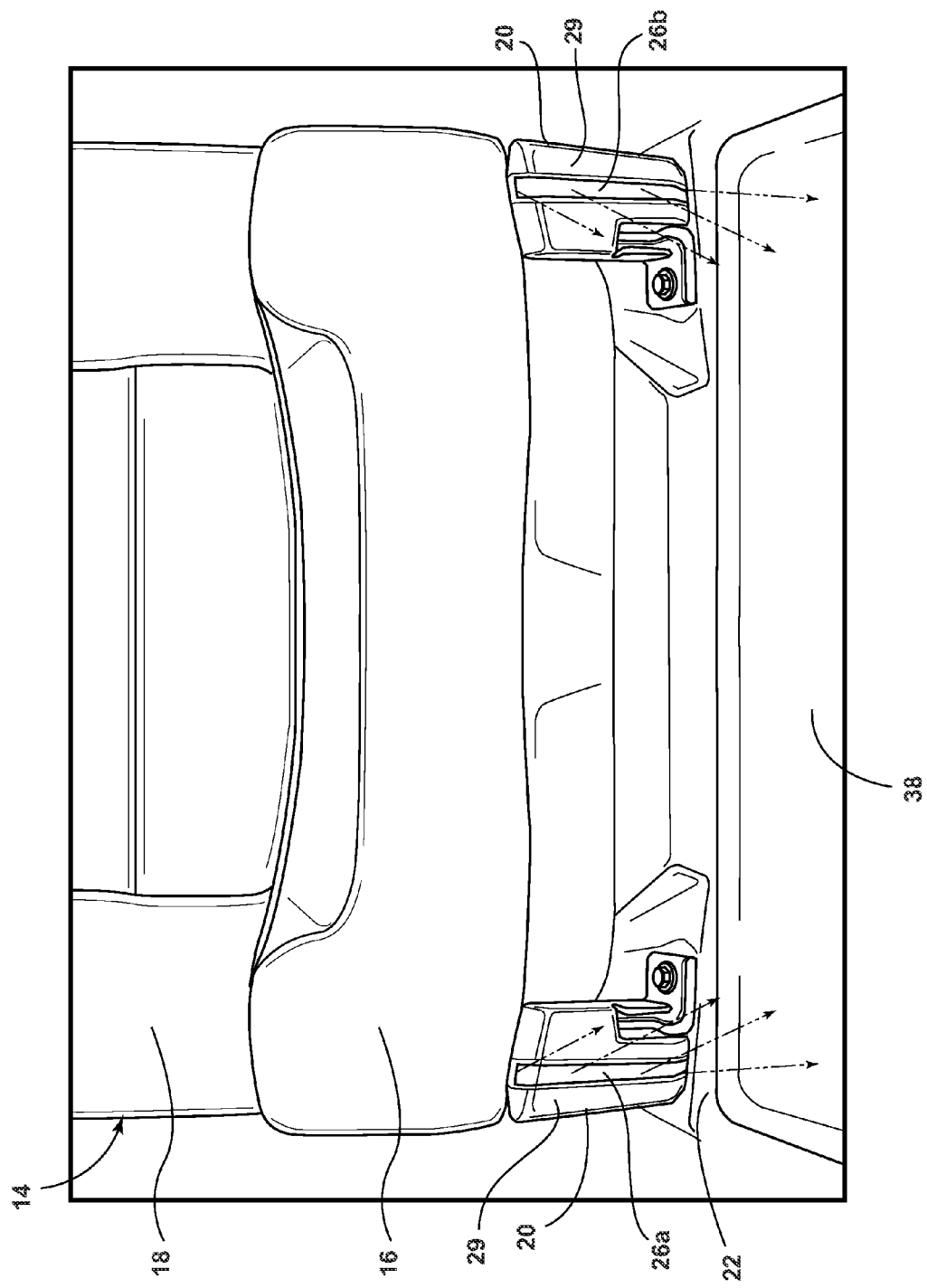
FIG. 2 is a front perspective view of the seat in FIG. 1, according to one embodiment.
Figure 3:
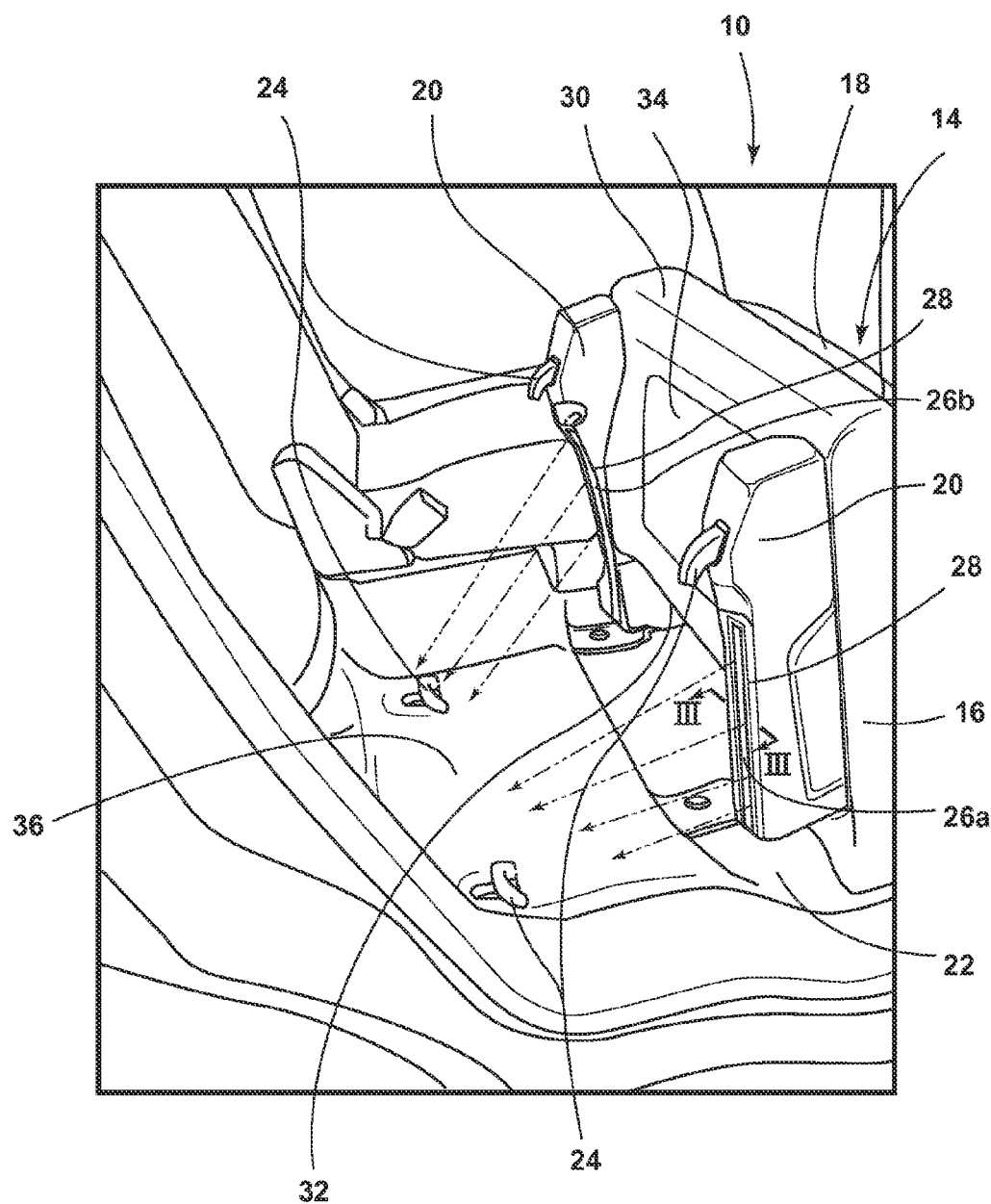
FIG. 3 illustrates another floor area being illuminated as a result of the seat being positioned in a stowed position, according to one embodiment.

Referring to FIGS. 1-3, a vehicle 10 is generally shown with a rear passenger door 12 moved to an open position. The vehicle 10 includes a seat 14 located in the second row and having a seat base 16 and seatback 18. The seat base 16 includes a pair of plastic support legs 20 that extend longitudinally with respect to the vehicle 10 when the seat 14 is in a use position depicted in FIG. 1. The support legs 20 are each pivotally coupled on one end to a floor 22 of the vehicle 10 and are each releasably secured on the other end to the floor 22 via a pair of mated mechanical fasteners 24. When released, the seat 14 may be moved to a stowed position as depicted in FIG. 3, wherein the seatback 18 is folded onto the seat base 16 and the seat base 16 is oriented in a substantially upright position.

At least one light-producing assembly, shown as light-producing assemblies 26a and 26b are each coupled to an underside portion of the seat base 16 and are each operable to luminesce to illuminate one or more floor areas based on the position of the seat 14. In the presently illustrated embodiment, each of the light-producing assemblies 26a, 26b are arranged as strips and may be insert molded to a corresponding support leg 20. For example, each light-producing assembly 26a, 26b may occupy a bottom portion 28 of the corresponding support leg 20 and extend onto a front portion 29 of the support leg 20. The light-producing assemblies 26a, 26b may be powered using a vehicle power source (not shown) or other power source. Additionally or alternatively, one or more light-producing assemblies may be coupled to other underside portions of the seat base 16 such as edge portions 30 and 32 as well as central portion 34.

When the seat 14 is moved to the stowed position (FIG. 3), the light-producing assemblies 26a, 26b may work in concert to illuminate a step-in area 36 that is located behind the seat 14 and allows ingress or egress to and from a third row seating area. When the seat 14 is moved to the use position (FIGS. 1 and 2), the step-in area 36 is covered by the seat base 16 and the light-producing assemblies 26a, 26b illuminate floor areas surrounding the seat 14 such as a footwell area 38 in front of the seat 14 and a floor area 39 located off to the side of the seat 14.

Figure 4:
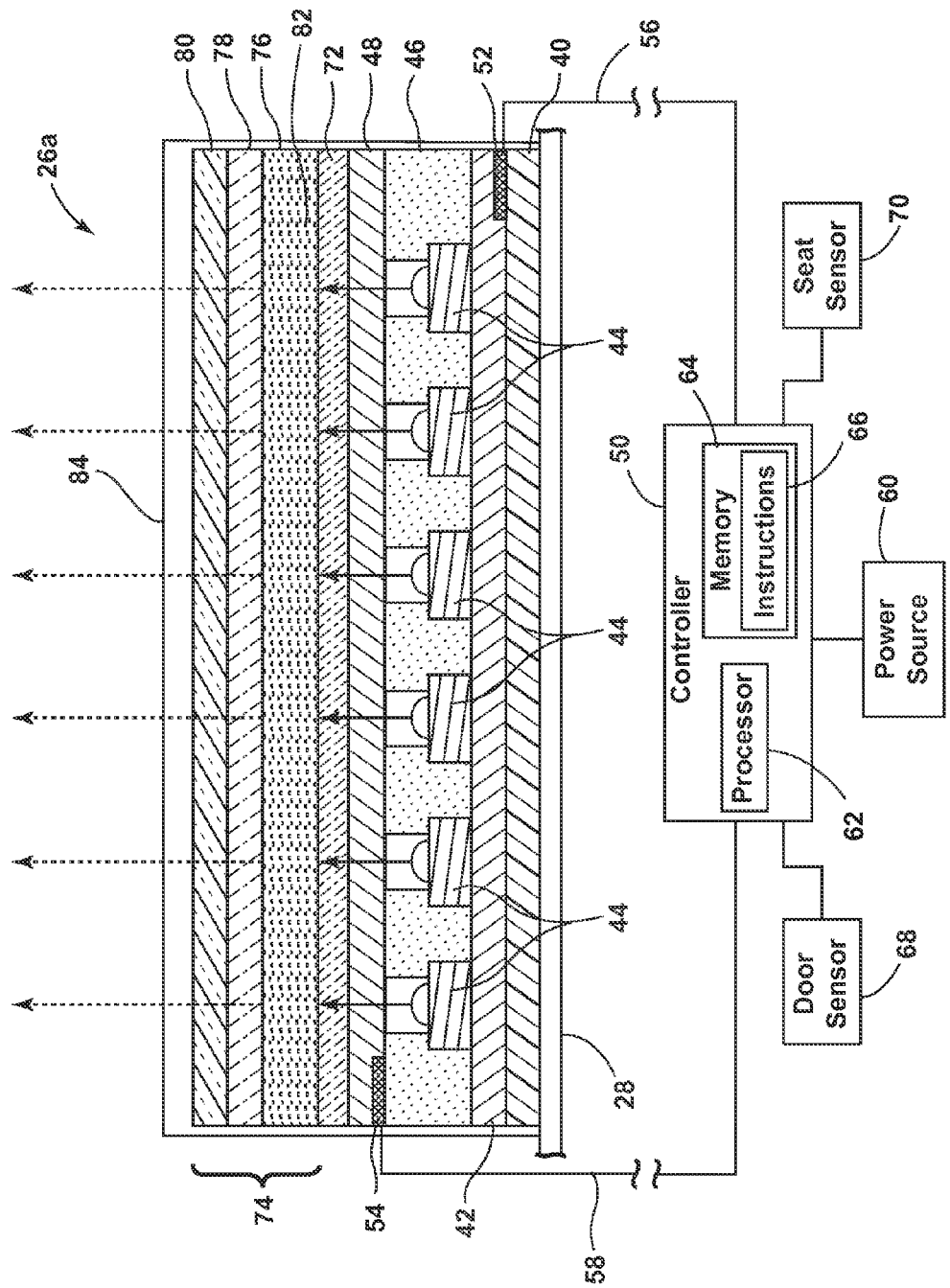
FIG. 4 is a cross-sectional view of a light-producing assembly taken along line III-III of FIG. 2.

Referring to FIG. 4, a cross-sectional view of light-producing assembly 26a is shown according to one embodiment. It should be appreciated that light-producing assembly 26b may be similarly arranged. The light-producing assembly 26a includes a substrate 40 arranged over the recessed portion 28. The substrate 40 may include a polycarbonate, poly-methyl methacrylate (PMMA), or polyethylene terephthalate (PET) material on the order of 0.005 to 0.060 inches thick. A positive electrode 42 is arranged over the substrate 40 and includes a conductive epoxy such as, but not limited to, a silver-containing or copper-containing epoxy. The positive electrode 42 is electrically connected to a plurality of light sources such as light emitting diodes (LEDs) 44, which are arranged within a semiconductor ink 46 and applied over the positive electrode 42. A negative electrode 48 is also electrically connected to the LEDs 44. The negative electrode 48 is arranged over the semiconductor ink 46 and includes a transparent or translucent conductive material such as, but not limited to, indium tin oxide. In alternative embodiments, the positive and negative electrodes 42, 48 may be flip-flopped, in which case the positive electrode 42 should include a transparent or translucent conductive material to transmit light emitted from the LEDs 44.

Each of the positive and negative electrodes 42, 48 are electrically connected to a controller 50 via a corresponding bus bar 52, 54 and a corresponding conductive lead 56, 58. The bus bars 52, 54 may be printed along opposite edges of the positive and negative electrodes 42, 48 and the points of connection between the bus bars 52, 54 and the conductive leads 56, 58 may be at opposite corners of each bus bar 52, 54 to promote uniform current distribution along the bus bars 52, 54. The conductive leads 56, 58 may be wired through the seat support leg 20 to the controller 50, which may be variously located in the vehicle 10 and is also electrically connected to a power source 60. In one embodiment, the power source 60 may correspond to a vehicular power source operating at 12 to 16 VDC. It should be appreciated that light-producing assembly 26b depicted in FIGS. 2 and 3 along with any additional light-producing assembles on seat 14 or other seats may also be electrically connected to controller 50 or a separate controller.

With respect to the presently illustrated embodiment, the controller 50 includes a processor 62 and a memory 64 that stores one or more instructions 66 executable by the processor 62. The controller 50 may control the LEDs 44 based on one or more signals received from vehicle equipment, user-operated switches, and the like. In one embodiment, the controller 50 may receive signals from a door sensor 68 operably coupled to door 12 and configured to supply the controller 50 with door status information (i.e., whether the door is open or closed). The controller 50 may also receive signals from a seat sensor 70 operably coupled to the seat 14 and configured to supply the controller 50 with seat status information (i.e., whether the seat 14 is in use or stowed). Based on the signals received from the door and/or seat sensors 68, 70, the controller 50 may modify the light output from LEDs 44.

The LEDs 44 may be dispersed in a random or controlled fashion within the semiconductor ink 46 and are disposed facing the vehicle cabin and may be configured to emit focused or non-focused light. The LEDs 44 may correspond to micro-LEDs of gallium nitride elements on the order of 5 to 400 microns in size and the semiconductor ink 46 may include various binders and dielectric material including, but not limited to, one or more of gallium, indium, silicon carbide, phosphorous, and/or translucent polymeric binders. In this manner, the semiconductor ink 46 may contain various concentrations of LEDs 44 such that the density of the LEDs 44 may be adjusted for various lighting applications. In some embodiments, the LEDs 44 and semiconductor ink 46 may be sourced from Nth Degree Technologies Worldwide Inc. The semiconductor ink 46 can be applied through various printing processes, including ink jet and silk screen processes to selected portion(s) of the positive electrode 42. More specifically, it is envisioned that the LEDs 44 are dispersed within the semiconductor ink 46, and shaped and sized such that a substantial quantity of them align with the positive and negative electrodes 42, 48 during deposition of the semiconductor ink 46. The portion of the LEDs 44 that ultimately are electrically connected to the positive and negative electrodes 42, 48 may be selectively activated and deactivated by the controller 50. An optional diffusing layer 72 may be arranged over the negative electrode 48 to diffuse light emitted from the LEDs 44 to more evenly excite a photoluminescent structure 74 arranged over the diffusing layer 72.

Referring still to FIG. 4, the photoluminescent structure 74 may be arranged as a coating, layer, film or other suitable deposition. With respect to the presently illustrated embodiment, the photoluminescent structure 74 may be arranged as a multi-layered structure including an energy conversion layer 76, an optional stability layer 78, and an optional protection layer 80. The energy conversion layer 76 includes at least one photoluminescent material 82 having energy converting elements with phosphorescent or fluorescent properties. For example, the photoluminescent material 82 may include organic or inorganic fluorescent dyes including rylenes, xanthenes, porphyrins, phthalocyanines. Additionally or alternatively, the photoluminescent material 82 may include phosphors from the group of Ce-doped garnets such as YAG:Ce. The energy conversion layer 76 may be prepared by dispersing the photoluminescent material 82 in a polymer matrix to form a homogenous mixture using a variety of methods. Such methods may include preparing the energy conversion layer 76 from a formulation in a liquid carrier medium and coating the energy conversion layer 76 to the diffusing layer 72 or the negative electrode 48. The energy conversion layer 76 may be applied to the diffusing layer 72 or the negative electrode 48 by painting, screen printing, flexography, spraying, slot coating, dip coating, roller coating, and bar coating. Alternatively, the energy conversion layer 76 may be prepared by methods that do not use a liquid carrier medium. For example, the energy conversion layer 76 may be rendered by dispersing the photoluminescent material 82 into a solid state solution (homogenous mixture in a dry state) that may be incorporated in a polymer matrix formed by extrusion, injection, compression, calendaring, thermoforming, etc.

To protect the photoluminescent material 82 contained within the energy conversion layer 76 from photolytic and thermal degradation, the photoluminescent structure 74 may optionally include stability layer 78. The stability layer 78 may be configured as a separate layer optically coupled and adhered to the energy conversion layer 76 or otherwise integrated therewith. The photoluminescent structure 74 may also optionally include protection layer 80 optically coupled and adhered to the stability layer 78 or other layer to protect the photoluminescent structure 74 along with other components of the light-producing assembly 26a from physical and chemical damage arising from environmental exposure. The stability layer 78 and/or the protection layer 80 may be combined with the energy conversion layer 76 through sequential coating or printing of each layer, sequential lamination or embossing, or any other suitable means. The photoluminescent structure 74 and other components of the light-producing assembly 26a may be covered by an over-mold 84 that may include a transparent elastomeric material (e.g., silicone rubber).

Additional information regarding photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. Also, additional information regarding printed LED arrangements is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

In operation, the photoluminescent structure 74 is configured to luminesce in response to excitation by light emitted by the LEDs 44. More specifically, light emitted from the LEDs 44 undergoes an energy conversion process where it's converted by the photoluminescent material 82 and is re-emitted therefrom at a different wavelength. The re-emitted light is subsequently outputted through the over-mold 84 to illuminate various floor areas based on the position of the seat 14. Light emitted by the LEDs 44 is referred to herein as inputted light and is demonstrated in FIG. 4 by solid arrows, whereas light re-emitted from the photoluminescent material 82 is referred to herein as converted light and is demonstrated in FIG. 4 by broken arrows. According to one embodiment, the photoluminescent material 82 may be formulated to convert inputted light into a longer wavelength light, otherwise known as down conversion. Alternatively, the photoluminescent material 82 may be formulated to convert inputted light into a shorter wavelength light, otherwise known as up conversion. Under either approach, light converted by the photoluminescent material 82 may be subsequently outputted from the photoluminescent structure 74 or otherwise used in an energy cascade, wherein the converted light serves as inputted light to excite another formulation of photoluminescent material located within the energy conversion layer 76, whereby the subsequent converted light may then be outputted from the photoluminescent structure 74 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 82 is formulated to have a Stokes shift resulting in the converted light having an emission spectrum expressed in a desired color, which may vary depending on the lighting application. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 44, which may offer a relative cost advantage over other colors of LEDs or simply using LEDs of the desired color and omitting the photoluminescent structure 74 altogether.

In alternative embodiments, the energy conversion layer 76 may include more than one distinct photoluminescent material, each configured to convert inputted light into a longer or shorter wavelength light. In one embodiment, the distinct photoluminescent materials may be interspersed within the energy conversion layer 76. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 44, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which is incorporated herein by reference.

In operation, the controller 50 may control the intensity of the LEDs 44 to ultimately affect the brightness in which the photoluminescent structure 74 luminesces. For example, increasing the intensity of the LEDs 44 generally results in the photoluminescent structure 74 exhibiting a brighter luminescence. The controller 50 may control the intensity of the LEDs 44 through pulse-width modulation or direct current control. In one embodiment, the controller 50 controls the light-producing assembly 26a to illuminate at variable intensity based on a position of the door 12, wherein the intensity at which the light-producing assembly 26 illuminates is higher when the door 12 is in an open position than when the door 12 is in a closed position. The position of the door 12 may be determined via door status information supplied by the door sensor 68. The controller 50 may also control the light-producing assembly 26a to illuminate at a higher intensity when the seat 14 is moved to the stowed position and a lower intensity when the seat 14 is moved to the use position. The position of the seat 14 may be determined via seat status information supplied by the seat sensor 70. It should be appreciated that light-producing assembly 26b depicted in FIGS. 2 and 3 along with any additional light-producing assemblies on seat 14 or other seats may be similarly controlled by controller 50 or a separate controller. When the light-producing assembly 26a is active, the controller 50 may control the light emission duration of the LEDs 44 to affect the duration in which the photoluminescent structure 74 luminesces. For example, the controller 50 may activate the LEDs 44 for an extended duration such that the photoluminescent structure 74 exhibits sustained luminescence. Alternatively, the controller 50 may flash the LEDs 44 at varying time intervals such that the photoluminescent structure 74 exhibits a blinking effect.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A floor lighting system of a vehicle, comprising:
   a vehicle seat having a seat base that is pivotable between a use position and a stowed position;
   a support leg disposed on an underside portion of the seat base and pivotally coupled to a floor of the vehicle; and
   a light-producing assembly coupled to the support leg and arranged as a strip extending along a bottom portion and a front portion of the support leg and configured to illuminate different floor areas based on the position of the seat base.

2. The floor lighting system of claim 1, wherein the light-producing assembly illuminates by luminescence.

3. The floor lighting system of claim 2, wherein the light-producing assembly comprises a printed LED arrangement and a photoluminescent structure configured to luminesce in response to excitation by light emitted from the printed LED arrangement.

4. The floor lighting system of claim 1, wherein when the seat base is in the use position, the light-producing assembly illuminates at least one of a footwell area and a floor area located off to a side of the seat base.

5. The floor lighting system of claim 1, wherein the light-producing assembly illuminates a step-in area when the seat base is in the stowed position, and wherein the step-in area is covered by the seat base when the seat base is in the use position.

6. The floor lighting system of claim 1, wherein the light-producing assembly illuminates at variable intensity based on a position of a door disposed proximate the seat, wherein the intensity at which the light-producing assembly illuminates is higher when the door is in an open position than when the door is in a closed position.

7. A floor lighting system of a vehicle, comprising:
   a vehicle seat having a seat base that is pivotable between a use position and a stowed position;
   a support leg disposed on an underside portion of the seat base and pivotally coupled to a floor of the vehicle; and
   a light-producing assembly coupled to the support leg and arranged as a strip extending along a bottom portion and a front portion of the support leg and configured to illuminate a footwell area in front of the seat when the seat base is in the use position and a step-in area behind the seat when the seat base is in the stowed position.

8. The floor lighting system of claim 7, wherein the light-producing assembly illuminates by luminescence.

9. The floor lighting system of claim 8, wherein the light-producing assembly comprises a printed LED arrangement and a photoluminescent structure configured to luminesce in response to excitation by light emitted from the printed LED arrangement.

10. The floor lighting system of claim 7, wherein the step-in area is covered by the seat base when the seat base is in the use position.

11. The floor lighting system of claim 7, wherein the light-producing assembly illuminates at variable intensity based on a position of a door disposed proximate the seat, wherein the intensity at which the light-producing assembly illuminates is higher when the door is in an open position than when the door is in a closed position.

12. A floor lighting system of a vehicle, comprising:
    a vehicle seat having a seat base pivotable between a use and a stowed position;
    a support leg disposed on an underside portion of the seat base and pivotally coupled to a floor of the vehicle; and
    a light-producing assembly coupled to the support leg and arranged as a strip that luminesces to illuminate different floor areas based on the position of the seat base.

13. The floor lighting system of claim 12, wherein the light-producing assembly comprises a printed LED arrangement and a photoluminescent structure configured to luminesce in response to excitation by light emitted from the printed LED arrangement.

14. The floor lighting system of claim 12, wherein when the seat base is in the use position, the light-producing assembly illuminates at least one of a footwell area and a floor area located off to a side of the seat base.

15. The floor lighting system of claim 12, wherein the light-producing assembly illuminates a step-in area when the seat base is in the stowed position, wherein the step-in area is covered by the seat base when the seat base is in the use position.

16. The floor lighting system of claim 12, wherein the light-producing assembly illuminates at variable intensity based on a position of a door disposed proximate the seat, wherein the intensity at which the light-producing assembly illuminates is higher when the door is in an open position than when the door is in a closed position.

* * * * *